(12) United States Patent
Lundgren et al.

(10) Patent No.: US 11,436,375 B2
(45) Date of Patent: Sep. 6, 2022

(54) PROCESSING DEVICE FOR REDUCING A LOAD ON A SYSTEM BUS

(71) Applicant: HUAWEI TECHNOLOGIES CO., LTD., Guangdong (CN)

(72) Inventors: Thomas Lundgren, Kista (SE); Johan Uden, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 153 days.

(21) Appl. No.: 16/526,665

(22) Filed: Jul. 30, 2019

(65) Prior Publication Data

US 2019/0354727 A1 Nov. 21, 2019

Related U.S. Application Data

(63) Continuation of application No. PCT/EP2017/052015, filed on Jan. 31, 2017.

(51) Int. Cl.
*G06F 21/72* (2013.01)
*G06F 13/42* (2006.01)
*H04L 9/40* (2022.01)

(52) U.S. Cl.
CPC .......... *G06F 21/72* (2013.01); *G06F 13/4208* (2013.01); *H04L 63/0428* (2013.01); *G06F 2221/2107* (2013.01)

(58) Field of Classification Search
CPC ................ G06F 21/72; G06F 13/4208; G06F 2221/2107; G06F 13/40; H04L 63/0428; H04L 63/0485

See application file for complete search history.

(56) References Cited

U.S. PATENT DOCUMENTS

| 5,034,980 A | * | 7/1991 | Kubota | ................... G06F 21/72 713/189 |
| 7,600,131 B1 | * | 10/2009 | Krishna | ................ G06F 9/3879 370/389 |

(Continued)

FOREIGN PATENT DOCUMENTS

| CN | 101510245 A | 8/2009 |
| CN | 103946856 A | 7/2014 |

(Continued)

OTHER PUBLICATIONS

"3GPP TR 38.913 V14.1.0 (Dec. 2016), 3rd Generation Partnership Project; Technical Specification Group Radio Access Network; Study on Scenarios and Requirements for Next Generation Access Technologies;(Release 14), 38 pages".

(Continued)

*Primary Examiner* — Cheng-Feng Huang
(74) *Attorney, Agent, or Firm* — Womble Bond Dickinson (US) LLP (57) ABSTRACT

The application relates to a processing device (100) including a buffer (102) coupled to a system bus, a ciphering device coupled to the system bus, and a memory coupled to the ciphering device. The processing device is configured to operate in at least one of a deciphering mode and a ciphering mode. In the deciphering mode, the ciphering device is configured to receive a ciphered data unit directly from the buffer over the system bus, decipher the ciphered data unit so as to obtain a deciphered data unit, and transfer the deciphered data unit to the memory. In the ciphering mode, the ciphering device is configured to receive a data unit from the memory, cipher the data unit so as to obtain a ciphered data unit, and transfer the ciphered data unit directly to the buffer over the system bus.

15 Claims, 7 Drawing Sheets

(56) References Cited

U.S. PATENT DOCUMENTS

| | | | |
|---|---|---|---|
| 7,826,614 B1 | 11/2010 | Kaniz et al. | |
| 2003/0014625 A1* | 1/2003 | Freed | H04L 63/0485 713/153 |
| 2003/0046563 A1* | 3/2003 | Ma | G06F 21/85 713/190 |
| 2003/0193949 A1* | 10/2003 | Kojima | H04L 69/22 370/392 |
| 2004/0158744 A1 | 8/2004 | Deng et al. | |
| 2004/0215963 A1* | 10/2004 | Kaplan | H04L 63/0428 713/172 |
| 2007/0140491 A1* | 6/2007 | Yi | H04W 12/037 380/250 |
| 2009/0077346 A1* | 3/2009 | Steinert | H04L 69/324 712/34 |
| 2016/0204907 A1* | 7/2016 | Chen | H04L 1/1812 370/328 |

FOREIGN PATENT DOCUMENTS

| | | |
|---|---|---|
| EP | 1192781 A2 | 4/2002 |
| JP | 2004328359 A | 11/2004 |
| WO | 2001005086 A2 | 1/2001 |

OTHER PUBLICATIONS

Qualcomm Incorporated, Broadcom, U-plane improvements for HW friendly implementations—UE RX side. 3GPP TSG-RAN WG2 Meeting #95 Gothenburg, Sweden Aug. 22-26, 2016, R2-165578, 4 pages.

Samsung, No. RLC concatenation in NR. R2-169092, Nov. 18, 2016, 16 pages.

Ericsson, UP stack with interleaved L-fields and concatenation in RLC. Nov. 18, 2016, 2 pages.

\* cited by examiner

Fig. 1

200a receiving a ciphered data unit DU directly from the buffer over the system bus
202a deciphering the ciphered data unit DU so as to obtain a deciphered data unit DU
204a transferring the deciphered data unit DU to a memory
206a

FIG. 2a

200b receiving a data unit DU from the memory
202b ciphering the data unit DU so as to obtain a ciphered data unit DU
204b transferring the ciphered data unit DU directly to the buffer over the system bus
206b

PROCESSING DEVICE FOR REDUCING A LOAD ON A SYSTEM BUS

CROSS-REFERENCE TO RELATED APPLICATIONS

This application is a continuation of International Application No. PCT/EP2017/052015, filed on Jan. 31, 2017, the disclosure of which is hereby incorporated by reference in its entirety.

TECHNICAL FIELD

The application relates to a processing device and a communication device comprising such a processing device. Furthermore, the application also relates to corresponding methods, a computer program, and a computer program product.

BACKGROUND

In the next generation wireless systems, such as 5G systems, the requirements on data rates are increasing and data rates of 20 Gbit/s in downlink and 10 Gbit/s data in uplink are being discussed. These requirements put a significant burden on communication devices and their ability to process data efficiently.

The processing of data in a conventional communication device involves a number of transfers of data between different functions and/or memories within the communication device. These transfers sometimes take place over a system bus, which can become a bottleneck when trying to achieve very high data rates. In some configurations, the system bus needs to be dimensioned to take three times the wanted maximum data rate to allow a sustained data rate to and from the communication device.

Consequently, there is a need for solutions which reduce the load on the system bus in communication devices.

SUMMARY

An objective of embodiments of the application is to provide a solution which mitigates or solves the drawbacks and problems of conventional solutions.

Another objective of embodiments of the application is to provide a solution which provides a more efficient processing in a communication device so as to reduce the load on the system bus.

The above and further objectives are solved by the subject matter of the independent claims. Further advantageous implementation forms of the application can be found in the dependent claims.

According to a first aspect of the application, the above mentioned and other objectives are achieved with a processing device comprising:
a buffer coupled to a system bus,
a ciphering device coupled to the system bus, and
a memory coupled to the ciphering device;
wherein the processing device is configured to operate in at least one of a deciphering mode and
a ciphering mode;
wherein the ciphering device, when the processing device is configured to operate in the deciphering mode, is configured to:
 receive a ciphered data unit directly from the buffer over the system bus,
 decipher the ciphered data unit so as to obtain a deciphered data unit,
 transfer the deciphered data unit to the memory;
wherein the ciphering device, when the processing device is configured to operate in the ciphering mode, is configured to
 receive a data unit from the memory,
 cipher the data unit so as to obtain a ciphered data unit,
 transfer the ciphered data unit directly to the buffer over the system bus.

A ciphering device may herein be understood to mean a device capable of performing ciphering of a data unit and deciphering of a ciphered data unit. The ciphering device can e.g. be implemented as a hardware device performing one or more ciphering functions.

The processing device according to the first aspect provides a number of advantages over conventional solutions. One such advantage is that the number of data transfers over the system bus required to cipher and/or decipher a data unit is reduced compared to conventional solutions. The load on the system bus is thereby reduced, e.g. leading to lower power consumption and lower latency in the processing device.

In a first implementation form of a processing device according to the first aspect, the processing device, when configured to operate in the deciphering mode, is further configured to:
 read a protocol header carried by a data block comprising the ciphered data unit,
 extract at least one ciphering parameter from the protocol header,
 provide the ciphering parameter to the ciphering device.

A ciphering parameter may herein be understood to mean a parameter used for producing configuration parameters for the ciphering device, e.g. a Packet Data Convergence Protocol (PDCP) Sequence Number (SN).

The first implementation form enables the configuration of the ciphering device for deciphering of the ciphered data unit.

In a second implementation form of a processing device according to the first implementation form of the first aspect, the ciphering device is further configured to:
 receive the ciphering parameter,
 decipher the ciphered data unit based on the received ciphering parameter so as to obtain the deciphered data unit.

The second implementation form provides the ciphering parameter to the ciphering device such that the ciphered data unit is deciphered by the ciphering device.

In a third implementation form of a processing device according to the second implementation form of the first aspect, the processing device is further configured to:
 read the protocol header directly from the buffer.

The third implementation form provides an efficient way of accessing the protocol header.

In a fourth implementation form of a processing device according to any of the first to third implementation forms of the first aspect or to the first aspect as such, the memory is coupled to the system bus and the processing device is further configured to:
 transfer at least one first segment of a ciphered data unit from the buffer to the memory if no protocol header for the ciphered data unit is available.

The fourth implementation form enables efficient handling of a segment of a ciphered data unit with no protocol header comprising one or more ciphering parameters, i.e. a segment which cannot be deciphered right away due to missing ciphering parameters. The buffer has limited memory resources. By transferring the segment of the ciphered data unit from the buffer to the memory, memory resources in the buffer are released. In addition, the segment can later be fetched from the memory for deciphering without using the system bus thereby reducing load on the system bus.

In a fifth implementation form of a processing device according the fourth implementation form of the first aspect, the ciphering device is further configured to:
  receive a ciphering parameter for the ciphered data unit,
  fetch the first segment of the ciphered data unit from the memory,
  receive a second segment of the ciphered data unit directly from the buffer over the system bus, wherein the second segment is a remaining segment of the ciphered data unit;
  decipher the first segment and the second segment of the ciphered data unit based on the received ciphering parameter so as to obtain a deciphered data unit.

The fifth implementation form enables a previously received segment of a ciphered data unit with no protocol header to be efficiently deciphered once the ciphering parameters for the segment is available. The deciphering of the previously received segment of the ciphered data unit can be performed without using the system bus as the segment has been stored in the memory which is directly accessible by the ciphering device thereby reducing load on the system bus.

In a sixth implementation form of a processing device according to any of the preceding the implementation forms of the first aspect or to the first aspect as such, the system bus is coupled to the memory only through the ciphering device so that access to the memory over the system bus is only possible through the ciphering device.

The sixth implementation form provides the deciphering of a ciphered data unit at the input interface to the memory and the ciphering of a data unit at the output interface from the memory, without any data units being transferred over the system bus between the ciphering device and the memory.

In a seventh implementation form of a processing device according to any of the preceding implementation forms of the first aspect or to the first aspect as such, the buffer is a reception buffer when the processing device is configured to operate in the deciphering mode, and the buffer is a transmission buffer when the processing device is configured to operate in the ciphering mode.

The seventh implementation form enables the deciphering to be performed without having to transfer the ciphered data unit from a reception buffer to another dedicated deciphering buffer. In a similar way, the ciphering can be performed without having to transfer the data unit from another dedicated ciphering buffer to a transmission buffer. The number of required buffers is thereby reduced.

In an eighth implementation form of a processing device according to the eighth implementation form of the first aspect, the buffer is a Hybrid Automatic Repeat Request (HARQ) buffer.

The eighth implementation form enables the processing device to be used in a Hybrid Automatic Repeat Request (HARQ) transmission system.

In a ninth implementation form of a processing device according to any of preceding implementation forms of the first aspect or to the first aspect as such, when configured to operate in the ciphering mode, the processing device is configured to cipher the data unit with a ciphering parameter so as to obtain the ciphered data unit, and transfer the ciphering parameter directly to the buffer over the system bus.

The ninth implementation form enables the configuration of the ciphering device for ciphering of the data unit with at least one ciphering parameter and provides the ciphering parameter to the buffer and maybe further to the other ciphering device such that the ciphered data unit can be deciphered by the other ciphering device.

In a tenth implementation form of a processing device according to the ninth implementation form of the first aspect, the ciphering device is configured to transfer the ciphering parameter in a protocol header of a data block (DB), directly to the buffer.

The tenth implementation form provides an efficient way of transferring the ciphering parameter.

In an eleventh implementation form of a processing device according to the tenth implementation form of the first aspect, the ciphering device is configured to, directly to the buffer, transfer the data block carrying a first segment of the ciphered data unit together with the ciphering parameter in the protocol header and to transfer another data block carrying a second segment of the ciphered data unit but not carrying the ciphering parameter.

The eleventh implementation form enables to transfer different segments of a data unit in different data blocks and the ciphering parameter used to cipher the segments is not necessarily transferred for multiple times, thereby further reduce the load on the system bus.

According to a second aspect of the application, the above mentioned and other objectives are achieved with a communication device for a communication system, the communication device comprising a processing device according to any of the preceding implementation forms of the first aspect or to the first aspect as such.

The communication device according to the second aspect provides a number of advantages over conventional solutions. One such advantage is that processing device provides a more efficient processing of data in the communication device. The power consumption in the communication device will thereby be reduced.

According to a third aspect of the application, the above mentioned and other objectives are achieved with a method for a processing device, the processing device comprises a buffer coupled to a system bus, a ciphering device coupled to the system bus, and a memory coupled to the ciphering device; the processing device is configured to operate in at least one of a deciphering mode and in a ciphering mode; the method comprises:
when the processing device is configured to operate in the deciphering mode,
  receiving, by the ciphering device, a ciphered data unit directly from a buffer over a system bus,
  deciphering, by the ciphering device, the ciphered data unit so as to obtain a deciphered data unit,
  transferring, by the ciphering device, the deciphered data unit to a memory;
when the processing device is configured to operate in the ciphering mode,
  receiving, by the ciphering device, a data unit from the memory,
  ciphering, by the ciphering device, the data unit so as to obtain a ciphered data unit,
  transferring, by the ciphering device, the ciphered data unit directly to the buffer over the system bus.

In a first implementation form of a method according to the third aspect, the method, when the processing device is configured to operate in the deciphering mode, further comprises:

reading, by the processing device, a protocol header carried by a data block comprising the ciphered data unit, extracting, by the processing device, at least one ciphering parameter from the protocol header, providing, by the processing device, the ciphering parameter to the ciphering device.

In a second implementation form of a method according to the first implementation form of the third aspect, the method further comprises receiving, by the ciphering device, the ciphering parameter, deciphering, by the ciphering device, the ciphered data unit based on the received ciphering parameter so as to obtain the deciphered data unit.

In a third implementation form of a method according to the second implementation form of the third aspect, the method further comprises reading, by the processing device, the protocol header directly from the buffer.

In a fourth implementation form of a method according to any of the first to third implementation forms of the third aspect or to the third aspect as such, the memory is coupled to the system bus and the method further comprises transferring, by the processing device, at least one first segment of a ciphered data unit from the buffer to the memory if no protocol header for the ciphered data unit is available.

In a fifth implementation form of a method according the fourth implementation form of the third aspect, the method further comprises receiving, by the ciphering device, a ciphering parameter for the ciphered data unit, fetching, by the ciphering device, the first segment of the ciphered data unit from the memory, receiving, by the ciphering device, a second segment of the ciphered data unit directly from the buffer over the system bus, wherein the second segment is a remaining segment of the ciphered data unit;

deciphering, by the ciphering device, the first segment and the second segment of the ciphered data unit based on the received ciphering parameter so as to obtain a deciphered data unit.

In a sixth implementation form of a method according to any of the preceding implementation forms of the third aspect or to the third aspect as such, the system bus is coupled to the memory only through the ciphering device so that access to the memory over the system bus is only possible through the ciphering device.

In a seventh implementation form of a method according to any of the preceding implementation forms of the third aspect or to the third aspect as such, the buffer is a reception buffer when the processing device is configured to operate in the deciphering mode, and the buffer is a transmission buffer when the processing device is configured to operate in the ciphering mode.

In an eighth implementation form of a method according to the eighth implementation form of the third aspect, the buffer is a Hybrid Automatic Repeat Request (HARQ) buffer.

The advantages of any method according to the third aspect are the same as those for the corresponding processing device claims according to the first aspect.

The application also relates to a computer program, characterized in code means, which when run by processing means causes said processing means to execute any method according to the present application. Further, the application also relates to a computer program product comprising a computer readable medium and said mentioned computer program, wherein said computer program is included in the computer readable medium, and comprises one or more from the group: ROM (Read-Only Memory), PROM (Programmable ROM), EPROM (Erasable PROM), Flash memory, EEPROM (Electrically EPROM) and hard disk drive.

Further applications and advantages of the present application will be apparent from the following detailed description.

BRIEF DESCRIPTION OF THE DRAWINGS

The appended drawings are intended to clarify and explain different embodiments of the present application, in which.

DETAILED DESCRIPTION

Ciphering and deciphering of data in a conventional communication device usually involves several transfers of data over a system bus. For example, when performing deciphering, ciphered data is usually first transferred from a buffer to an external memory over the system bus. In a second operation a ciphering function deciphers the ciphered data. The ciphering function is usually implemented in a peripheral hardware device which is using the system bus to transfer ciphered data from the external memory and to transfer deciphered data back to the external memory. With this configuration, the system bus should be dimensioned to take at least three times the maximum data rate to allow a sustained rate. Furthermore, the external memory needs to be able to take at least twice the maximum data rate. At a maximum data rate of 20 Gbit/s this means that the system bus needs to be able to handle 60 Gbit/s and the external memory needs to be able to handle 40 Gbit/s. Hence, there is a need to minimise the number of data transfers and thereby reduce indirect transfers between the buffer, the external memory and the ciphering function that lead to the load on the system bus and the external memory.

Embodiments of the application provide a more efficient deciphering and ciphering process with fewer data transfers over the system bus. This functionality can e.g. be implemented in a communication device and will avoid repeated transfers between the memory and the ciphering function over the system bus. Data does not need to be transferred indirectly from the buffer to the ciphering function over not only the system bus but also the memory used to store the data and the load on the system bus and the external memory of the communication device is thereby reduced.

Figure 1:
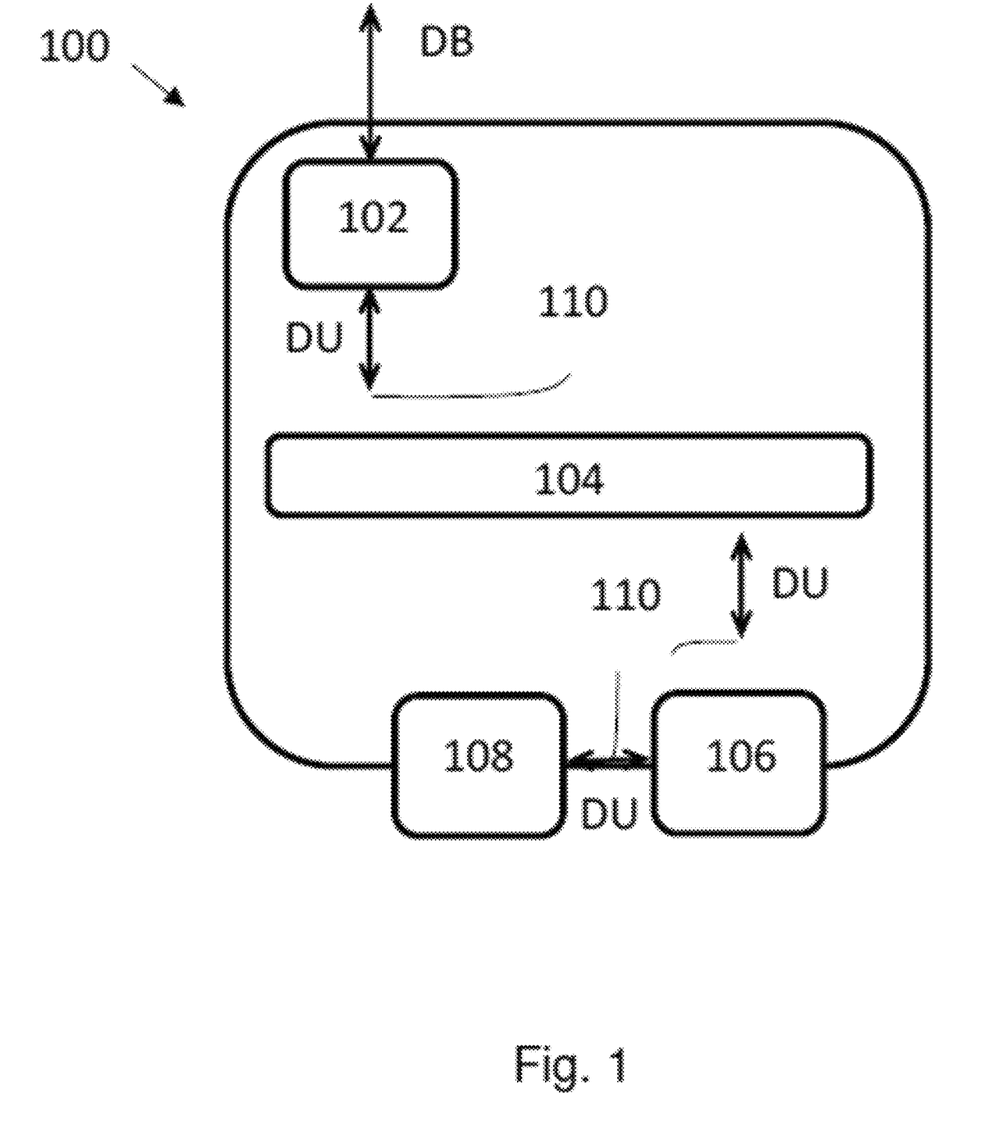
FIG. 1 shows a processing device according to an embodiment of the application.

According to an embodiment of the application the improved deciphering and ciphering process is performed by a processing device, such as the processing device 100 shown in FIG. 1. The processing device 100 comprises a buffer 102 coupled to a system bus 104. The processing device 100 further comprises a ciphering device 106 coupled to the system bus 104 and a memory 108 coupled to the ciphering device 106. The system bus 104 is coupled to the buffer 102 and the ciphering device 106 by means of communication 110. Also, the ciphering device 106 and the memory 108 are coupled to each other by means of communication 110. In the embodiment of the processing device 100 shown in FIG. 1 the system bus 104 is coupled to the memory 108 only through the ciphering device 106. This means that access to the memory 108 over the system bus 104 is only possible through the ciphering device 106. However, the application is not limited to this embodiment. In some embodiments the memory 108 can instead be coupled directly to both the system bus 104 and the ciphering device 106. In such an embodiment, the memory 108 can be accessed directly from the system bus 104 as well as through the ciphering device 106. One such embodiment will be explained below with reference to FIG. 5.

The processing device 100 is configured to operate in at least one of a deciphering mode and a ciphering mode. This means that the processing device 100 can operate either in one of the mentioned modes or in both modes e.g. at the same time or at different times. In addition, the processing device 100 could also be able to switch between the different modes of operation depending on the current ciphering and deciphering needs. Hence, at any given time the processing device 100 may be operating either in the deciphering mode or in the ciphering mode, or in both the deciphering mode and the ciphering mode. In an embodiment, the buffer 102 is a reception buffer configured to receive one or more data blocks DBs when the processing device 100 is configured to operate in the deciphering mode. In an embodiment, the buffer 102 is a transmission buffer configured to transmit one or more data blocks DBs when the processing device 100 is configured to operate in the ciphering mode. The buffer 102 can e.g. be a Hybrid Automatic Repeat Request (HARQ) buffer when the processing device 100 is operating in, or is part of a HARQ transmission system.

When the processing device 100 is configured to operate in the deciphering mode, the ciphering device 106 is configured to receive a ciphered data unit (DU) directly from the buffer 102 over the system bus 104. The ciphering device 106 is further configured to decipher the ciphered data unit (DU) so as to obtain a deciphered data unit (DU), and to transfer the deciphered data unit (DU) to the memory 108.

When the processing device 100 is configured to operate in the ciphering mode, the ciphering device 106 is configured to receive a data unit (DU) from the memory 108. The ciphering device 106 is further configured to cipher the data unit (DU) so as to obtain a ciphered data unit (DU), and to transfer the ciphered data unit (DU) directly to the buffer 102 over the system bus 104 for transmission.

Figure 2A:
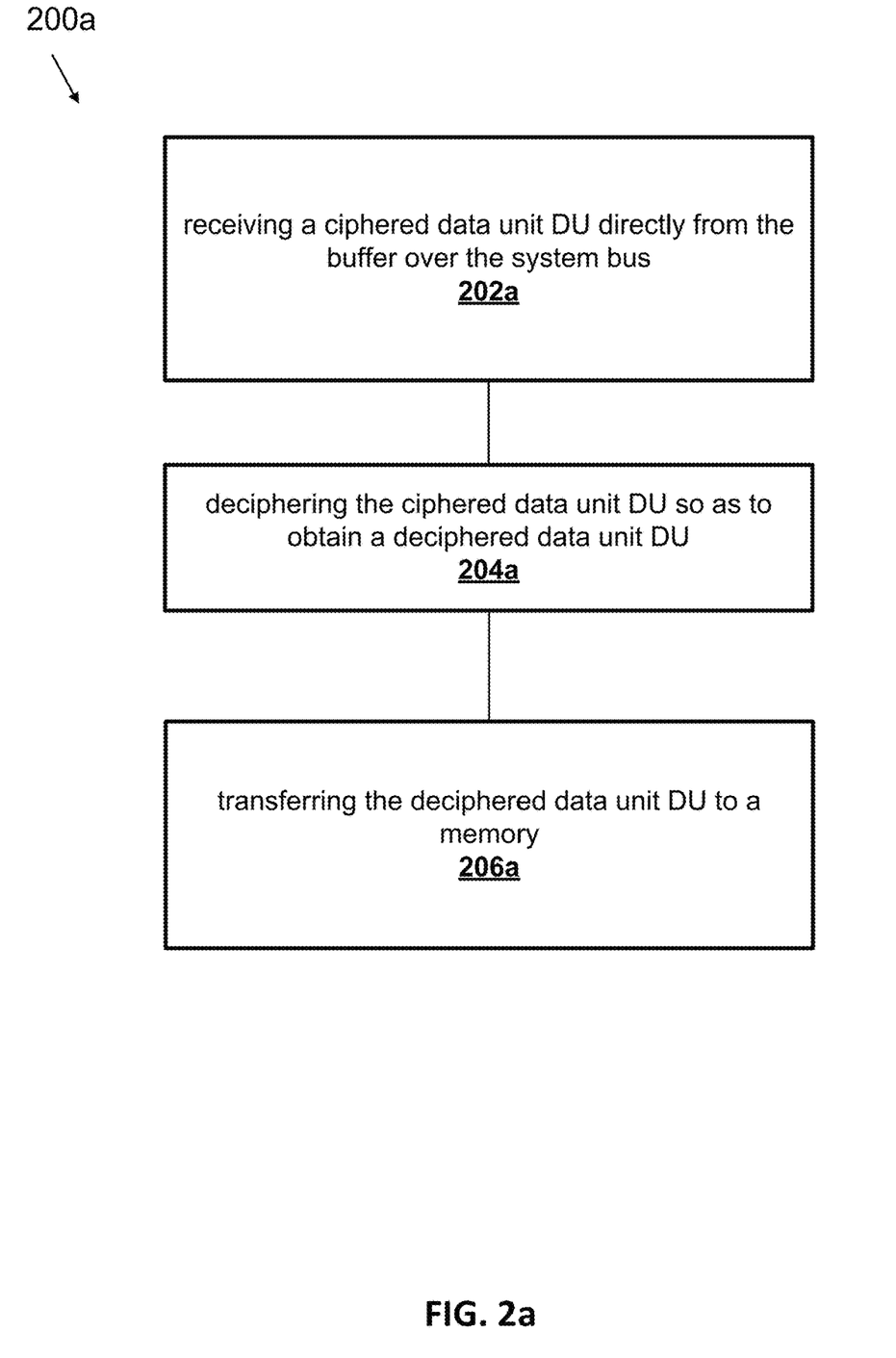
FIG. 2a-2b shows methods according to embodiments of the application.
Figure 2B:
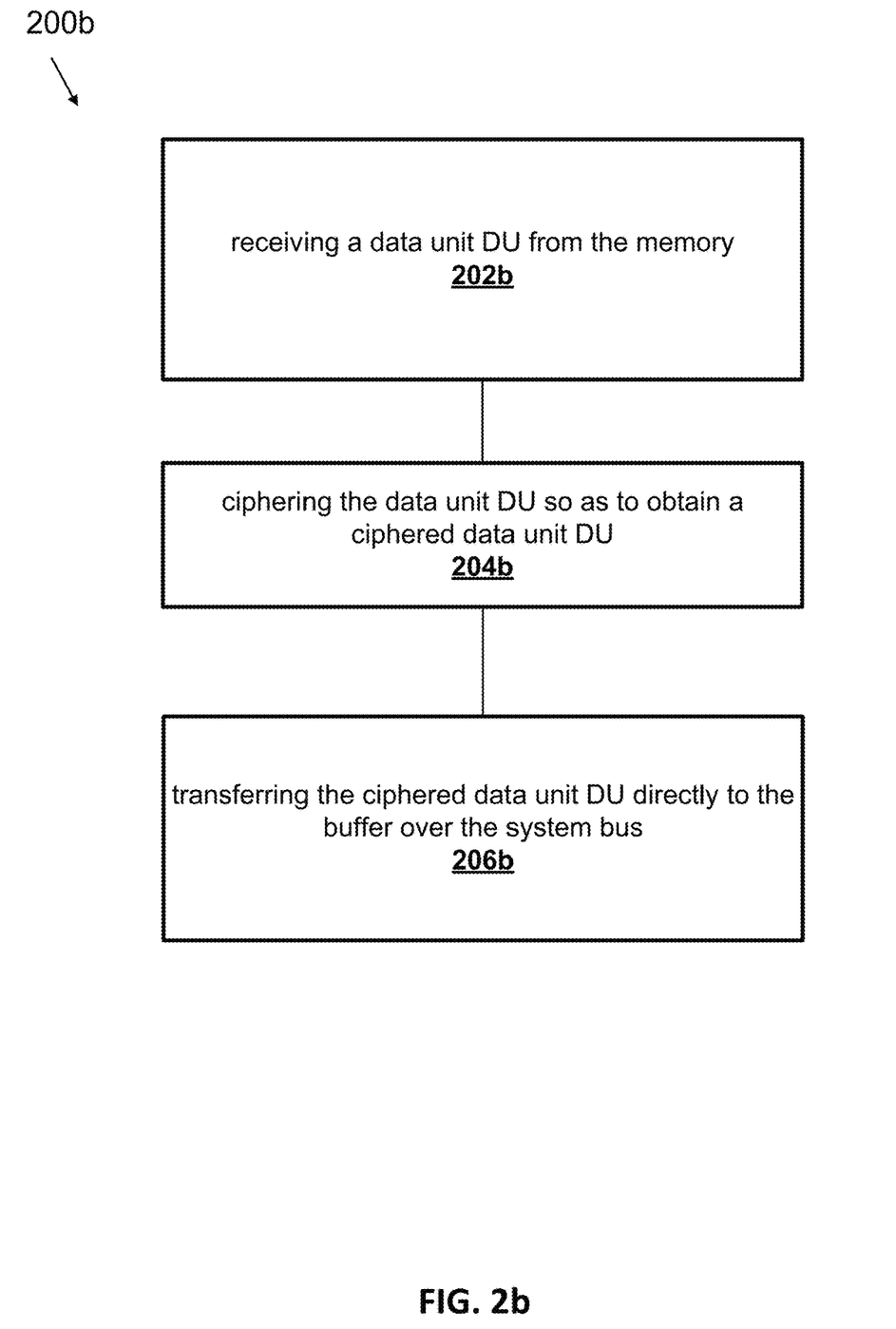

FIGS. 2a-2b show flow charts of corresponding methods 200a and 200b which may be executed in a processing device 100, such as the one shown in FIG. 1. The processing device 100 may execute the methods 200a and 200b in serial, in parallel, or in a combination of serial and parallel such that the method operations in methods 200a and 200b overlap in time.

The method 200a may be executed when the processing device 100 is configured to operate in the deciphering mode and comprises the operations of receiving 202a a ciphered data unit (DU) directly from the buffer 102 over the system bus 104, deciphering 204a the ciphered data unit (DU) so as to obtain a deciphered data unit (DU), and transferring 206a the deciphered data unit (DU) to a memory 108. The operations of the method 200a may be performed by the ciphering device 106 in the processing device 100.

The method 200b may be executed when the processing device 100 is configured to operate in the ciphering mode and comprises the operations of receiving 202b a data unit (DU) from the memory 108, ciphering 204b the data unit (DU) so as to obtain a ciphered data unit (DU), and transferring 206b the ciphered data unit (DU) directly to the buffer 102 over the system bus 104. The operations of the method 200b may be performed by the ciphering device 106 in the processing device 100.

Figure 3:
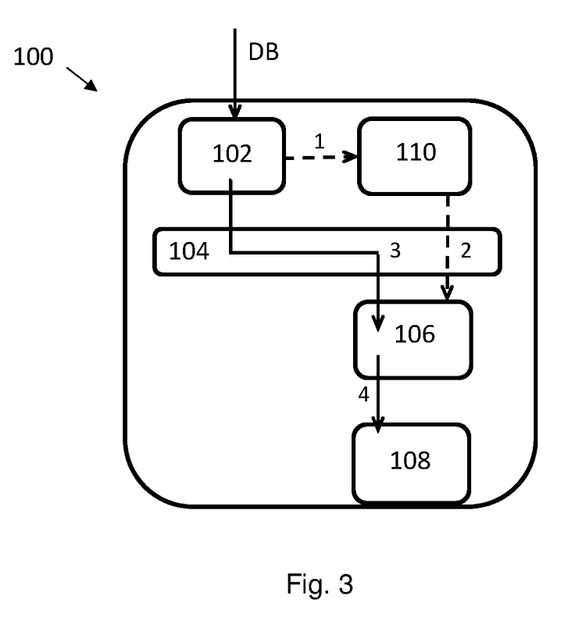
FIG. 3 illustrates a deciphering process according to an embodiment of the application.

FIG. 3 illustrates a deciphering process according to an embodiment of the application where the processing device 100 is configured to operate in the deciphering mode. In this embodiment, the buffer 102 may be a reception buffer which receives a data block (DB) comprising a ciphered data unit (DU). The ciphering device 106 performs the deciphering of the ciphered data unit (DU) at the input interface to the memory 108, i.e. during the transfer of the data unit (DU) from the buffer 102 to the memory 108. The data block (DB) received by the buffer 102 comprises at least one ciphered data unit (DU) and may also comprise a protocol header associated with the ciphered data unit (DU). The protocol header comprises information from which one or more ciphering parameters can be extracted or derived. A ciphering parameter can be a parameter used for producing configuration parameters for the ciphering device 106, i.e. a parameter which the ciphering device 106 can use to decipher the ciphered data unit (DU). The deciphering operation can e.g. be a bitwise logical exclusive-OR (XOR) operation between a ciphering overlay and the ciphered data unit (DU), where the ciphering overlay is the same ciphering overlay which was used to cipher the data unit (DU).

In a first operation of the deciphering process, the processing device 100 reads the protocol header carried by the data block (DB) comprising the ciphered data unit (DU). In the embodiment shown in FIG. 3, the protocol header is read by a processor 110 of the processing device 100 (dashed arrow 1 in FIG. 3). However, the application is not limited to this embodiment. The reading operation can in some embodiments be performed by another device or function in the processing device 100. In FIG. 3 the processor 110 reads the protocol header directly from the (reception) buffer 102, as shown by arrow 1. Alternatively, the processor 110 can read the protocol header via another device or function in the processing device 100. The processor 110 then extracts at least one ciphering parameter from the protocol header and in a second operation provides the ciphering parameter to the ciphering device 106 (dashed arrow 2 in FIG. 3). The ciphering device 106 receives the ciphering parameter and is thereby configured to perform the deciphering of the ciphered data unit (DU) based on the received ciphering parameter. In a third operation, the ciphering device 106 fetches the ciphered data unit (DU) directly from the buffer 102 (arrow 3 in FIG. 3) over the system bus 104 without having stored the data unit (DU) in the memory 108 before. The ciphering device 106 thereafter deciphers the fetched ciphered data unit (DU) based on the received ciphering parameter to obtain a deciphered data unit (DU). The deciphered data unit (DU) is then transferred to the memory 108 (arrow 4 in FIG. 3) where it can be accessed later for further processing. As the ciphering device 106 is directly coupled to the memory 108, the transfer of the deciphered data unit (DU) from the ciphering device 106 to the memory 108 can be performed directly, i.e. without the need of using the system bus 104.

When using the deciphering process according to the embodiment shown in FIG. 3 a data unit (DU) is only transferred one time over the system bus 104 to both decipher the ciphered data unit (DU) and store the deciphered data unit (DU) in the memory 108. This results in reduced load on the system bus 104 compared to conventional solutions, as conventional solutions usually require at least three transfers of a data unit over a system bus to perform the deciphering and storing operations.

Figure 4:
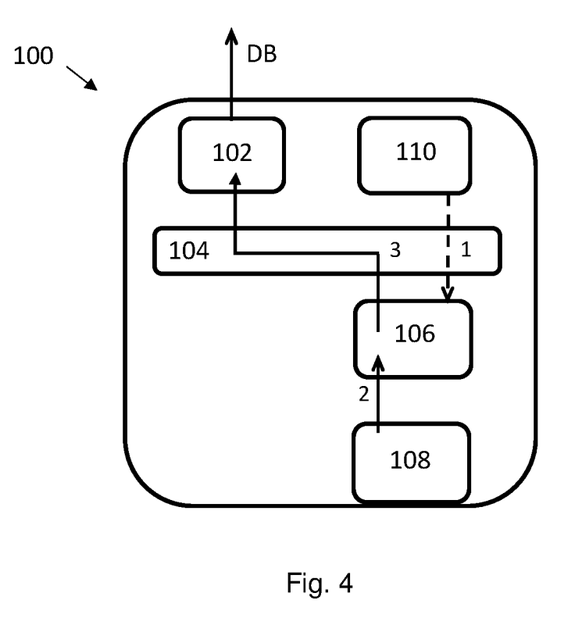
FIG. 4 illustrates a ciphering process according to an embodiment of the application.

FIG. 4 illustrates a ciphering process according to an embodiment of the application where the processing device 100 is configured to operate in the ciphering mode. In this embodiment, the buffer 102 is a transmission buffer which holds data to be transmitted, e.g. using a wireless interface. Such data can for example be a data block (DB) comprising a ciphered data unit (DU). For deriving the ciphered data unit (DU), the ciphering device 106 performs the ciphering at the output interface from the memory 108, i.e. during the transfer of the not yet ciphered data unit (DU) from the memory 108 to the buffer 102. FIG. 4 shows that the ciphering device 106 at first may get configured by the processor 110 (dashed arrow 1 in FIG. 4). As in the deciphering scenario this involves the processor 110 providing at least one ciphering parameter to the ciphering device 106. In the ciphering case, the processor 110 may obtain at least one ciphering parameter from a protocol state of the ciphering function performed by the ciphering device 106. The protocol state could be stored in the memory 108. In a second operation, the ciphering device 106 fetches the data unit (DU) to be ciphered and transmitted from the memory 108 (arrow 2 in FIG. 4). The ciphering device 106 ciphers the data unit (DU) based on the received ciphering parameter to obtain a ciphered data unit (DU). The ciphered data unit (DU) is then transferred to the buffer 102 (arrow 3 in FIG. 4) over the system bus 104.

The ciphering process according the embodiment shown in FIG. 4 also leads to reduced load on the system bus, due to the reduced number of transfers over the system bus 104 compared to conventional solutions.

In certain scenarios, deciphering of a ciphered data unit (DU) cannot be performed at the time of reception of a data block (DB) comprising the ciphered data unit (DU), e.g. due to missing ciphering parameters for the ciphered data unit (DU) in the data block (DB). Ciphering parameters for a ciphered data unit (DU) may be missing, e.g. if segmentation of data units (DUs) is used. Segmentation may divide a ciphered data unit (DU) into two or more segments, where only one of the segments comes with a protocol header from which the ciphering parameters can be extracted. As the different segments of the ciphered data unit (DU) may be transmitted in different data blocks (DBs), some of the data blocks (DBs) may comprise a segment of the ciphered data unit (DU) which does not come with any protocol header. Hence, no ciphering parameters can be extracted for this segment of the ciphered data unit (DU) and the segment cannot be deciphered.

Figure 5:
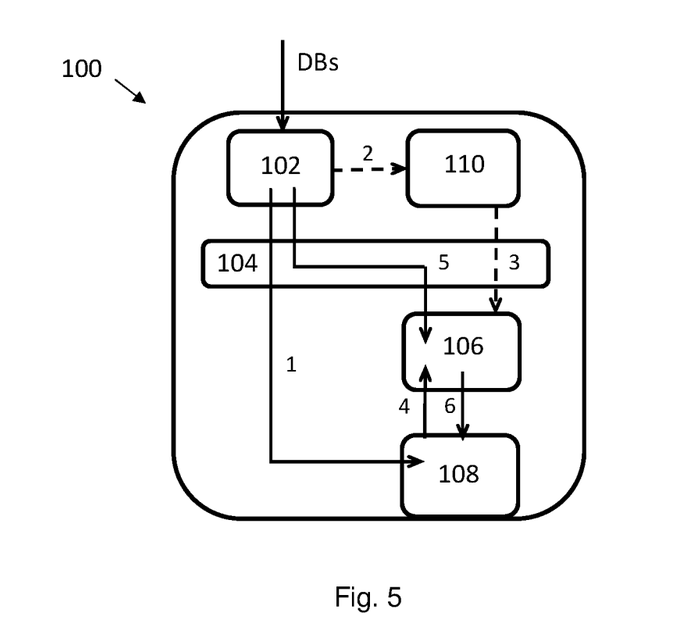
FIG. 5 illustrates a deciphering process according to an embodiment of the application.

FIG. 5 illustrates one such embodiment where a received data block (DB) comprises at least one first segment of a ciphered data unit (DU) which cannot be deciphered due to missing ciphering parameters since the first segment does not come with a proper protocol header included in the data block (DB). The processing device 100 is in this embodiment configured to transfer the at least one first segment of the ciphered data unit (DU) from the buffer 102 to the memory 108 if no protocol header for the ciphered data unit (DU) is found (arrow 1 in FIG. 5). This transfer to the memory 108 is repeated for each received first segment with missing ciphering parameters. In the embodiment shown in FIG. 5, the memory 108 is coupled directly to the system bus 104 and the buffer 102 transfers the at least one first segment of the ciphered data unit (DU) over the system bus 104 directly to the memory 108, as shown by arrow 1. In some embodiments, the buffer 102 may instead transfers the at least one first segment of the ciphered data unit (DU) over the system bus 104 via the ciphering device 106 to the memory 108 (not shown in FIG. 5), but without the ciphering device 106 performing any ciphering of the at least one first segment of the ciphered data unit (DU).

When a data block (DB) comprising a second segment of the ciphered data unit (DU) and comprising the missing protocol header is received by the buffer 102, the processor 110 reads the protocol header from the buffer 102 (dashed arrow 2 in FIG. 5). The processor 110 can then extract the at least one ciphering parameter from the protocol header and provide the ciphering parameter to the ciphering device 106 (dashed arrow 3 in FIG. 5). The ciphering device 106 receives the ciphering parameter for the at least one first segment and the second segment of the ciphered data unit (DU). The ciphering device 106 then fetches the at least one first segment of the ciphered data unit (DU) from the memory 108 (arrow 4 in FIG. 5) and receives the second segment of the ciphered data unit (DU) directly from the buffer 102 over the system bus 104 (arrow 5 in FIG. 5). The second segment can for example be a remaining segment of the ciphered data unit (DU). When the ciphering device 106 has obtained both the at least one first segment and the second segment, it deciphers the at least one first segment and the second segment of the ciphered data unit (DU) based on the received ciphering parameter to obtain a deciphered data unit (DU). Finally, the deciphered data unit (DU) is transferred to the memory 108 (arrow 6 in FIG. 5). As the ciphering device 106 is directly coupled to the memory 108 the at least one first segment of the ciphered data unit (DU) can be fetched by the ciphering device 106 without involving the system bus 104. It is to be noted that the notation first segment and second segment does not relate to the location of a segment in a data unit (DU). Hence, the first segment can be a front segment, a middle segment or a tail segment of a data unit (DU). The same holds for the second segment. However, the first segment and the second segment should not form the same segment of the data unit (DU).

Figure 6:
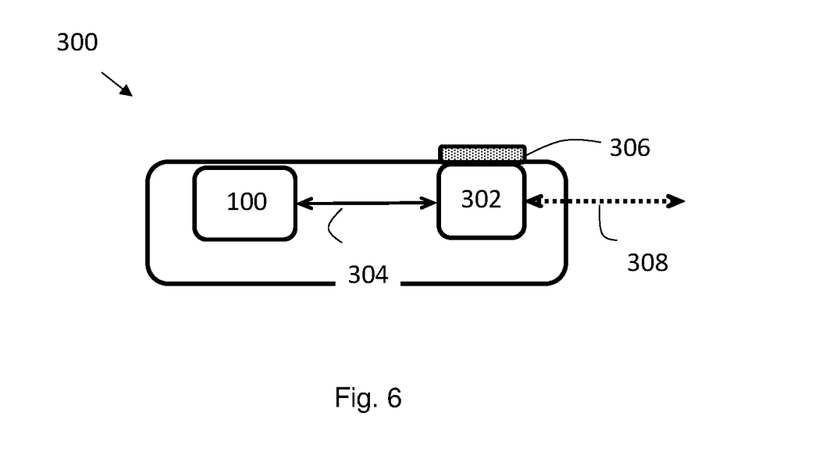
FIG. 6 shows a communication device according to an embodiment of the application.

According to an embodiment of the application the processing device 100 is comprised in a communication device, such as the communication device 300 shown in FIG. 6. The communication device 300 comprises the processing device 100 and a transceiver 302 in this example. The processing device 100 and the transceiver 302 are coupled to each other by means of communication 304. The communication device 300 can be configured for both wireless and wired communications in wireless and wired communication systems, respectively. The wireless communication capability is provided with an antenna 306 coupled to the transceiver 302, while the wired communication capability is provided with a wired communication interface 308 coupled to the transceiver 302.

The processing device 100 can in an embodiment be comprised in a communication device 300 configured to operate in a wireless communication system supporting e.g. enhanced Mobile BroadBand (eMBB) with high speeds up to 20 Gbit/s. In such an embodiment, a data block DB corresponds to a transport block and a data unit (DU) corresponds to a Service Data Unit (SDU). The deciphering process according to the application in such an embodiment will now be described in more details based on two different example scenarios. In the first scenario it is assumed that the transport blocks are received in-sequence and in the second scenario it is assumed that the transport blocks are received out-of-sequence.

Figure 7:
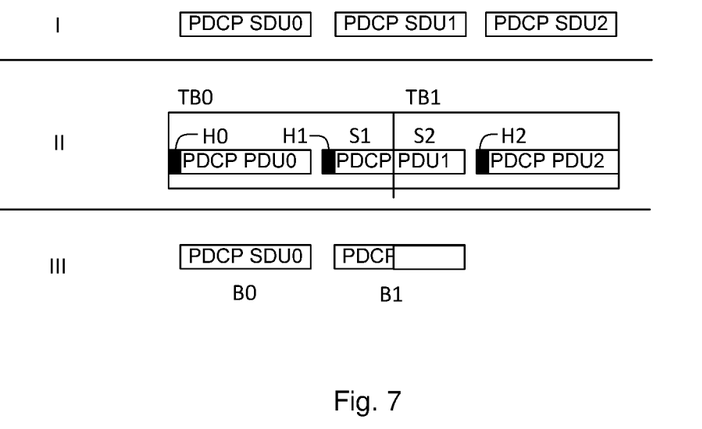
FIG. 7 shows a first operation of a first deciphering scenario according to an embodiment of the application.
Figure 8:
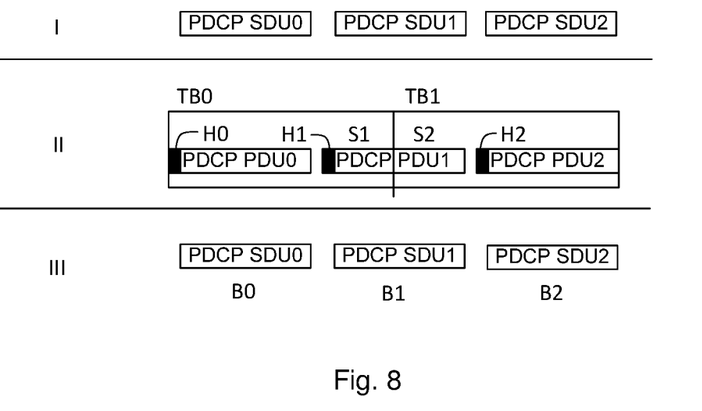
FIG. 8 shows a second operation of the first deciphering scenario.

The first scenario is shown in FIG. 7 and FIG. 8. In this scenario, a transmitting device (not shown in FIGS. 7 and 8) transmits three package data convergence protocol (PDCP) SDUs. These three PDCP SDUs, PDCP SDU0, PDCP SDU1, and PDCP SDU2 are shown in section I of FIGS. 7 and 8. PDCP SDU0, PDCP SDU1, and PDCP SDU2 are ciphered and packaged into PDCP Packet Data Unit (PDU) 0, PDCP PDU1, and PDCP PDU2, respectively. Each PDCP PDU comprises a PDCP header, H0, H1, and H2, respectively. The PDCP PDUs are transmitted in transport blocks (TBs, also referred to as data blocks DBs before). Section II in FIGS. 7 and 8 shows how the three PDCP PDUs in this example are divided into two transport blocks TB0 and TB1. PDCP PDU0 and a first segment S1 of PDCP PDU1 are transmitted in the first transport block TB0. A second segment S2 of PDCP PDU1 and PDCP PDU2 are transmitted in the second transport block TB1. The transmitted transport blocks (TBs) are received by the processing device 100 which deciphers the received PDCP PDUs. Deciphered PDCP SDUs are stored in buffers B0, B1 in the memory 108. Section III in FIGS. 7 and 8 shows the buffers B0, B1 allocated in memory 108 and the deciphered PDCP SDUs stored in these buffers B0, B1.

In the first scenario, the processing device 100 receives the first transport block TB0 before the second transport block TB1. FIG. 7 shows a first operation of the first scenario, in which the first transport block TB0 has been received. The deciphering process in the first operation corresponds to the deciphering process according to the embodiment shown in FIG. 3. When the first transport block TB0 has been received the processing device 100 can decipher the complete PDCP SDU0 and the first segment S1 of PDCP SDU1. The deciphering of the first segment of PDCP SDU1 is possible since the PDCP header H1 is comprised in the transport block TB0 carrying the first segment S1 of PDCP PDU1. From the PDCP header H1 the PDCP Sequence Number (SN) can be extracted and the PDCP SN can then be used to calculate the COUNT ciphering parameter. Hence, the transport block TB0 carrying the first segment S1 of PDCP PDU1 comprises the information necessary to obtain the ciphering parameter allowing the ciphering device 106 to decipher the first segment S1 of PDCP SDU1. The deciphered PDCP SDU0, which is complete, is transferred and stored in a buffer B0 allocated in the memory 108. The deciphered first segment S1 of PDCP SDU1 is also transferred to the memory 108 and stored in an allocated buffer B1, awaiting the second segment S2 of the PDCP SDU1. Section III in FIG. 7 shows the buffers B0 and B1 and their content after the deciphering of the first transport block TB0.

The size of the buffers B0, B1 should be allocated based on the length of the PDCP SDUs, such that the complete PDCP SDU can fit into the allocated buffer BN (where N is an index integer). In the case when a complete PDCP SDU is received and deciphered the length of the PDCP SDU will always be known. However, when only a segment of a PDCP SDU is received this might not always be the case. If the length field from the transport block TB is enough to determine the real length of the complete PDCP SDU then the real length may be used to allocate the buffer BN. On the other hand, if the length field only represents the segment length and not the complete PDCP SDU length, then the PDCP SDU length cannot be determined. In this case, the maximum PDU size of for example 1500 bytes may be used. Additionally, intelligent functions may take advantage of higher layer protocol information, e.g. IP header, to determine buffer BN size.

In a second operation of the first scenario, the second transport block TB1 has been received. The second operation is shown in FIG. 8. The second transport block TB1 was received after the first transport block TB0 and the second transport block TB1 contains the second segment S2 of PDCP PDU1 and the complete PDCP PDU2. The deciphering process in the second operation also corresponds to the deciphering process according to the embodiment shown in FIG. 3. Since together with the first segment S1 of PDCP PDU1 the corresponding PDCP header H1, has already been received the COUNT value to be used when deciphering the second segment S2 of PDCP SDU1 is known to the ciphering device 106. The ciphering device 106 can therefore decipher the second segment S2 of PDCP SDU1. The deciphered second segment S2 of PDCP SDU1 is transferred and stored into the already allocated PDCP SDU buffer B1 in memory 108, where the first segment S1 of the PDCP SDU1 is already stored. PDCP SDU2 which is complete can also be deciphered and transferred to the memory 108, where it is stored in an allocated buffer B2. Section III in FIG. 8 shows the buffers B0, B1 and B2 and their content after the deciphering of the second transport block TB1.

Figure 9:
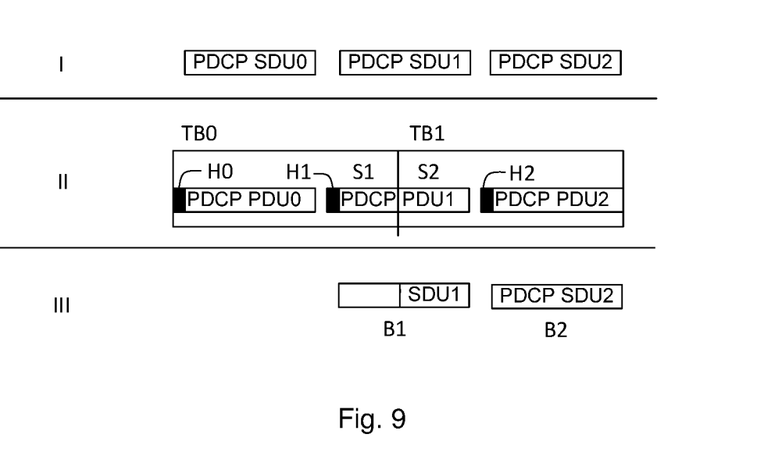
FIG. 9 shows a first operation of a second deciphering scenario according to an embodiment of the application.
Figure 10:
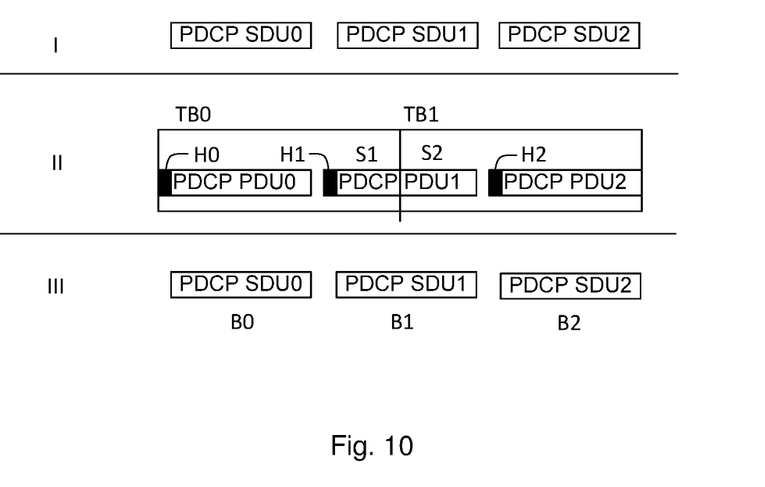
FIG. 10 shows a second operation of the second deciphering scenario.

In the second scenario shown in FIG. 9 and FIG. 10, the same transport blocks TBs as in the first scenario are transmitted but the processing device 100 receives the second transport block TB1 before the first transport block TB0. FIG. 9 shows a first operation of the second scenario, in which the second transport block TB1 has been received. The deciphering process in the first operation corresponds to the deciphering process according to the embodiment shown in FIG. 5. Since the first transport block TB0 has not been received, the PDCP header H1 is not available. Hence, the COUNT value cannot be calculated and the second segment S2 of PDCP SDU1 cannot be deciphered. The ciphered data is therefore transferred into a buffer B1 in the memory 108 and will be stored ciphered there until the PDCP header H1 (comprised in the first transport block TB0) is received. The size of the buffer B1 can be determined based on the segment offset and the size of the segment S2. For example, if the segment S2 size is known to be X and the segment offset is Y, then the buffer B1 may be allocated as X+Y. PDCP SDU2 which is complete and for which PDCHP header H2 is available can be deciphered and transferred to the memory 108, where it is stored in an allocated buffer B2. Section III in FIG. 9 shows the buffers B1 and B2 and their content after the deciphering of the second transport block TB1.

FIG. 10 shows a second operation of the second scenario, in which the first transport block TB0 has been received. When the first transport block TB0 is received, the first segment S1 of PDCP SDU1 can be deciphered as it comprises the first segment S1 of PDCP SDU1 and the corresponding PDCP header H1. In addition, deciphering of the previously received second segment S2 of PDCP SDU1 is now also possible based on the PDCP header H1. While deciphering the segmented PDCP SDU1 the ciphering device 106 will first decipher the first segment S1 of PDCP SDU1 from the buffer 102 and then continue to decipher the second segment S2 of PDCP SDU1, which is fetched from the buffer B1 in memory 108. The ciphering device 106 may have a small working memory where the deciphering is performed, i.e. where the ciphering overlay is applied. When the ciphering device 106 fetches a ciphered data unit (DU) from the memory 108 for deciphering, the ciphering device 106 can transfer the deciphered result back to the same memory location from which the ciphered data unit (DU) was fetched, i.e. buffer B1 for the second segment S2 of PDCP SDU1. Hence, after deciphering both the deciphered first segment S1 of PDCP SDU1 and the deciphered second segment S2 of PDCP SDU1 are transferred to the memory 108 and stored in buffer B1. Section III in FIG. 10 shows the buffers B0, B1 and B2 and their content after the deciphering of the first transport block TB0.

Any method according to embodiments of the application may be implemented in a computer program, having code means, which when run by processing means causes the processing means to execute the operations of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the processing device 100 and the communication device 300 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, digital signal processors (DSPs), MSDs, Trellis Coded Modulation (TCM) encoder, TCM decoder, power supply units, power feeders, communication interfaces, communication protocols, etc. which are suitably arranged together for performing the present solution.

Especially, the processing device 100 and the communication device 300 may comprise e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

The communication device 300 herein may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system, and/or is enabled for wired communication in a wired communications system. The UEs may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The communication device 300 may also be configured for communication in 3GPP related LTE and LTE-Advanced, in WiMAX and its evolution, and in fifth generation wireless technologies, such as New Radio.

Finally, it should be understood that the application is not limited to the embodiments described above, but also relates to and incorporates all embodiments within the scope of the appended claims.

The invention claimed is:

1. A processing device comprising:
a buffer directly coupled to a system bus,
a ciphering device directly coupled to the system bus, and
a memory directly coupled to the ciphering device and directly coupled to the system bus;
wherein the processing device is configured to operate in at least one of a deciphering mode or a ciphering mode;
wherein the ciphering device, when the processing device is configured to operate in the deciphering mode, is configured to:
receive a ciphered data unit (DU) from the buffer over the system bus,
transfer the ciphered data unit to the memory;
decipher the ciphered data unit at an input interface to the memory to obtain a deciphered data unit, and
transfer the deciphered data unit to the memory;
wherein the ciphering device, when the processing device is configured to operate in the ciphering mode, is configured to:
receive a data unit from the memory,
cipher the data unit at an output interface from the memory to obtain a ciphered data unit, and
transfer the ciphered data unit to the buffer over the system bus.

2. The processing device according to claim 1, wherein the processing device, when configured to operate in the deciphering mode, is further configured to:
read a protocol header carried by a data block (DB) comprising the ciphered data unit,
extract at least one ciphering parameter from the protocol header, and
provide the at least one ciphering parameter to the ciphering device.

3. The processing device according to claim 2, wherein the ciphering device is further configured to:
receive the ciphering parameter,
decipher the ciphered data unit based on the received ciphering parameter to obtain the deciphered data unit.

4. The processing device according to claim 3, further configured to:
read the protocol header directly from the buffer.

5. The processing device according to claim 1, wherein the memory is coupled to the system bus, and wherein the processing device is configured to:

transfer at least one first segment of a ciphered data unit from the buffer to the memory if no protocol header for the ciphered data unit is available.

6. The processing device according to claim 5, wherein the ciphering device is further configured to:
receive a ciphering parameter for the ciphered data unit,
fetch the first segment of the ciphered data unit from the memory,
receive a second segment of the ciphered data unit directly from the buffer over the system bus, wherein the second segment is a remaining segment of the ciphered data unit;
decipher the first segment and the second segment of the ciphered data unit based on the received ciphering parameter to obtain a deciphered data unit.

7. The processing device according to claim 1, wherein the system bus is coupled to the memory only through the ciphering device.

8. The processing device according to claim 1, wherein the buffer is a reception buffer when the processing device is configured to operate in the deciphering mode, and wherein the buffer is a transmission buffer when the processing device is configured to operate in the ciphering mode.

9. The processing device according to claim 8, wherein the buffer is a Hybrid Automatic Repeat Request buffer.

10. The processing device according to claim 1, wherein the processing device, when configured to operate in the ciphering mode, is configured to:
cipher the data unit with a ciphering parameter so as to obtain the ciphered data unit, and
transfer the ciphering parameter directly to the buffer over the system bus.

11. The processing device according to claim 10, wherein the ciphering device is further configured to:
transfer the ciphering parameter in a protocol header of a data block (DB) directly to the buffer.

12. The processing device according to claim 11, wherein the ciphering device is configured to:
transfer, directly to the buffer, the data block carrying a first segment of the ciphered data unit together with the ciphering parameter in the protocol header, and
transfer, directly to the buffer, another data block carrying a second segment of the ciphered data unit but not carrying the ciphering parameter.

13. The processing device according to claim 1, wherein the processing device is comprised in a communication device for a communication system.

14. A method for a processing device, the processing device comprising
a buffer directly coupled to a system bus,
a ciphering device directly coupled to the system bus, and
a memory directly coupled to the ciphering device and directly coupled to the system bus;
wherein the processing device is configured to operate in at least one of a deciphering mode or in a ciphering mode, the method comprising:
when the processing device is configured to operate in the deciphering mode,
receiving, by the ciphering device, a ciphered data unit from a buffer over a system bus,
transferring the ciphered data unit to the memory;
deciphering, by the ciphering device, the ciphered data unit at an input interface to the memory so as to obtain a deciphered data unit,
transferring, by the ciphering device, the deciphered data unit to a memory; when the processing device is configured to operate in the ciphering mode,
receiving, by the ciphering device, a data unit from the memory,
ciphering, by the ciphering device, the data unit at an output interface from the memory to obtain a ciphered data unit,
transferring, by the ciphering device, the ciphered data unit to the buffer over the system bus.

15. A computer program product comprising a non-transitory computer-readable medium and computer executable instructions stored on the non-transitory computer-readable medium, wherein when the instructions are executed by a processor, causes the processor to perform operations comprising:
receiving, by a ciphering device directly coupled to a system bus, a ciphered data unit from a buffer over the system bus, the buffer is directly coupled to the system bus;
transferring the ciphered data unit to a memory;
deciphering, by the ciphering device, the ciphered data unit at an input interface to the memory to obtain a deciphered data unit;
transferring, by the ciphering device, the deciphered data unit to the memory, the memory is directly coupled to the ciphering device and directly coupled to the system bus;
receiving, by the ciphering device, a data unit from the memory;
ciphering, by the ciphering device, the data unit at an output interface from the memory so as to obtain a ciphered data unit; and
transferring, by the ciphering device, the ciphered data unit to the buffer over the system bus.

* * * * *